Sept. 2, 1958      A. ROWLEY      2,849,948
BARBECUE
Filed July 12, 1954
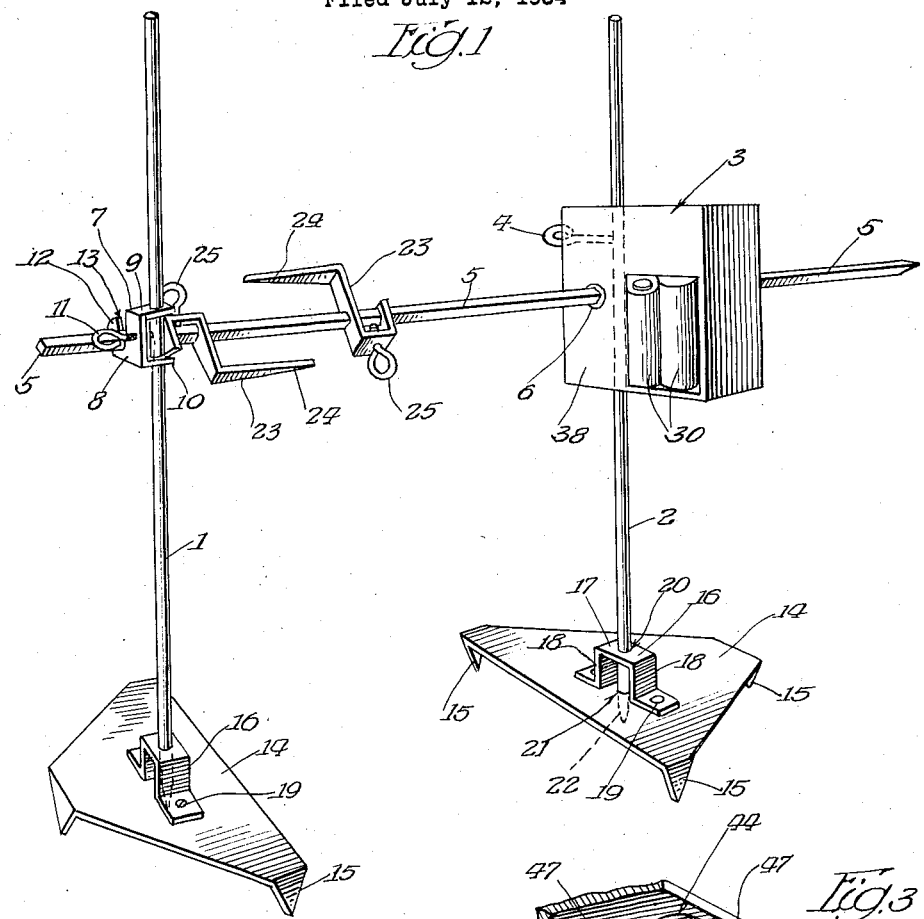
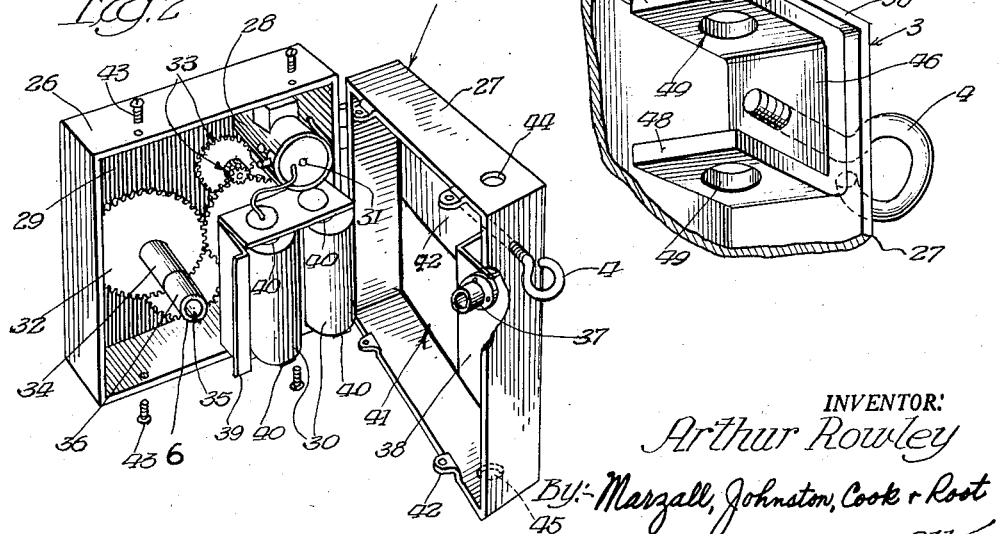
INVENTOR:
Arthur Rowley
BY:- Marzall, Johnston, Cook & Root
Attys.

United States Patent Office 2,849,948
Patented Sept. 2, 1958

2,849,948

BARBECUE

Arthur Rowley, Green Lake, Wis.

Application July 12, 1954, Serial No. 442,464

6 Claims. (Cl. 99—421)

This invention relates to a barbecue whereby articles to be roasted, or otherwise cooked, are mounted upon a revolving rod located above a source of heat.

The present invention consists in the provision of certain bases into which vertical standards may be removably supported. One standard adjustably carries a casing or housing which houses an electric motor operated by dry cell batteries. A rotary hollow sleeve or spindle drives a horizontal rod or spit which carries or supports the substance. The spit is adapted to pass through a hollow spindle and through the casing, thus making the spit adjustable through the casing as well as adjustable with respect to another vertical supporting standard. Instead of using the supporting bases to support the standards, the standards have pointed ends which may be stuck or pushed directly into the earth.

The primary object of the present invention is the provision of a barbecue having a housing or container for housing complete operating mechanism, the housing being slidably mounted on a vertical standard which extends through the housing, the spit also passing through the housing and being driven by a motor operated hollow spindle.

Another object of the invention consists in the arrangement of completely housed driving mechanism slidingly supported on a vertical rod or standard and slidingly receiving a horizontal spit or substance support, all the operating mechanism being self-contained within the housing or casing.

A further object of the invention consists in the provision of a barbecue having a casing or housing through which a vertical rod or standard projects, the casing supporting certain driving mechanism including a hollow driven spindle whereby a horizontal substance supporting rod or spit can pass through the container and through the spindle to drive the spindle and to effect horizontal adjustment of the substance support; vertical adjustment of the housing being had by vertically shifting the casing on its vertical standard.

Still another object of the invention consists in the provision of new and improved means for supporting the vertical standards or rods so that the barbecue may be supported on the lawn, in the fireplace, or other convenient place, the supporting bases removably supporting the standards, which are pointed, whereby the standards, when removed from the base, may be forced into the ground.

Numerous other objects and advantages will be apparent throughout the progress of the specification which is to follow.

The accompanying drawing illustrates a selected embodiment of the invention, and the views therein are as follows:

Fig. 1 is a detail perspective view of the improved barbecue;

Fig. 2 is a detail perspective view of the housing or casing in which all the operating mechanism is housed; and Fig. 3 is a detail perspective view showing adjustable locking means arranged within the housing.

The particular construction herein shown for the purpose of illustrating the invention comprises vertical supports or standards 1 and 2, Fig. 1. A container or housing 3 is slidably mounted on the standard 2 and is locked in adjusted position by locking means 4. A horizontal substance supporting rod or spit 5 passes through the container housing 3 and is adapted to be driven by a hollow rotary sprindle 6, Fig. 2. A shackle member 7 is adjustable vertically on the standard 1 to support the opposite free end of the substance rod or spit 5. The shackle element 7 is relatively U-shaped or channel-shaped in cross section and comprises an end piece 8 and upper and lower flanges or legs 9 and 10, respectively, Fig. 1. The flanges 9 and 10 are provided with alined holes through which the standard 1 is received. A set screw or locking member 11 threadedly engages the part 8 and is adapted to bear against the standard 1 for locking the shackle 7 in vertical adjusted position. The shackle member 7 also includes an extension 12 having a slot 13 to receive one end of the substance rod or spit 5.

The standards 1 and 2 are adapted to be supported on horizontal metal plates 14 which may be of any desired shape, but are shown herein as being relatively triangular. Each plate 14 is provided with downwardly extending projections 15 which are bent from the plate 14 and are adapted to rest on a suitable surface, such as a fireplace, lawn, table, and the like. A bracket member 16 is fixed to each plate 14 and comprises a channel-shaped member having a top 17 and oppositely disposed side members or legs, 18, 18. The member 16 is adapted to be secured to the plate 14 in any suitable manner, such as by spot welding the side flanges which extend from the legs 18, as indicated at 19, Fig. 1. The upper surface 17 of the member 16 is provided with a circular opening or hole 20 which is in alinement with a smaller opening or hole 21 formed in the plate 14. The standards 1 and 2 pass through the openings 20, and have their pointed ends 22 extending into the openings 21. The size of the openings 21, and the size of the conical shaped ends 22 of the standards, is such that they will extend only a short distance into the holes 21. Therefore, there will be no interference with the standards when the plates 14 are mounted on a hard surface such as a fireplace, road, or other place. The standards 1 and 2 are identical in construction and may be freely interchanged. They may be removed from the plates 14 and stuck into the ground to support them properly.

The horizontal substance supporting rod or spit 5 is preferably multi-sided in cross section, and is adapted to support substance gripping or impaling member 23, 23, which are slidably mounted on the spit or rod 5. Each member 23 is provided with a substance engaging or holding prong 24 to pierce or impale the substance. The members 23 are adapted to be locked in adjusted position by means of set screws or thumb nuts 25 which threadedly engage a part of the members 23 and bear against a side of the rod or spit 5.

The container or housing 3, Fig. 2, is box-like in formation and relatively rectangular in shape. It preferably comprises two sections, 26 and 27, Fig. 2. An electric motor 28 is rigidly connected to the end wall 29 of the box and is electrically connected to one or more dry cell batteries 30. An electric switch (not shown, but mounted on the outside of the end wall 29) permits current to flow from the batteries and to the motor 28 when the electric switch is operated. The motor shaft 31 of the motor 28 carries a small pinion or gear (not shown) which drives a larger gear 32 through the chain of gears 33. The gear 32 is provided with a hollow spindle shaft 34 which has a tubular opening 35 extending completely therethrough. The rear end of the hollow spindle shaft 34 extends rearwardly of the main gear 32 and projects a short distance beyond the rear wall 29 of the part 26 of the housing 3, being supported by a collar or sleeve (not shown) on the inside of the wall 29. The forward end 36 of the spindle shaft 34 is relatively elongated and is adapted to project into, and be supported by, a hollow sleeve 37 mounted on the inner wall 38 of the housing part 27. Thus, when the parts 26 and 27 of the container or housing 3 are brought together in the position shown in Fig. 1, the hollow spindle 34 will be supported by the sleeve on the wall 29 and by the sleeve 37 on the wall 38, and inasmuch as the spindle 34 is hollow, the horizontal substance rod or spit 5 is free to pass through the hollow spindle and be adjustably supported therethrough and to be rotated by the rotation of the spindle. The spindle 34 has driving connection with the rod or spit 5 so that, during rotation of the spindle 34 by the gear 32, the spit 5 will rotate. The locking of the sleeve 34 to the spit 5 may be done in any convenient manner, but it is preferable that at least part of the spindle 34 be multi-sided to cooperate with the multi-sided spit 5 to form the driving connection. The multi-sided spit or rod 5 is free to be slid horizontally through the hollow spindle 34, and through the opposite sides of the housing, and to be rotatingly driven by the motor 28 through the chain gears 33.

The dry cell batteries 30 are mounted in a support 39 between upper clips and lower clips 40, 40 for electrical contact from the cells 30 to the motor 28. If desired, the part 27 of the housing 3 may be formed with a cutout 41 opposite the battery cells 30 so that the dry cells may be replaced or interchanged easily, without opening the housing. The housing may be hingedly connected, if desired, or it may comprise lips 42 on the part 27 overlapping the inside edges of the periphery of the part 26, and held in position by screws 43.

The part 27 of the housing 3 is provided with upper and lower alined holes 44 and 45, through which a standard is adapted to pass. Therefore, the housing 3 is vertically mounted slidingly upon a standard. The housing 3 is locked in adjusted position to a standard by the locking member 4, Fig. 3. The member 4 threadedly engages the back 46 of a channel-shaped member which has extending legs 47 and 48. The legs 47 and 48 are provided with alined holes 49, 49, which aline with the holes 44 and 45 in the housing. Thus, the housing 3 is self-contained and is adapted to be slid vertically along a standard 1 or 2 and then locked into adjusted position by the manipulation of the member 4, Fig. 3.

The invention provides a barbecue which is provided with vertical standards for engaging the removable bases, or for being pushed into the ground. The operating mechanism for rotating the spit or rod 5 is self-contained within the housing 3, and permits the spit or rod 5 to extend completely through the housing because of the hollow spindle 34. In some instances the substance on the horizontal spit 5 may be positioned relatively close to the housing so that the cooking operation may be carried on by the use of only one standard.

The invention also provides for both horizontal and vertical adjustment of the spit 5, the horizontal adjustment being effected by the shifting of the rod through the housing 3, while the vertical adjustment is accomplished by the vertical shifting of the housing on a standard. The device is self-contained, compact, and may be assembled and taken apart easily and quickly. The present invention accomplishes all the advantages of other spits, takes but little space, may be easily carried about, and may be economically manufactured as the parts are made of metal and therefore are easily formed.

The method of mounting the motor and all its cooperating mechanism on a single plate or wall, and the motor brush and contacts to the brush are disclosed in applicant's copending application filed concurrently herewith, Serial No. 442,554, now Patent No. 2,741,713.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. A portable demountable battery operated barbecue comprising a housing defined by enclosing walls, a vertical standard passing through the upper and lower walls of the housing, a hollow horizontal driving spindle journaled in the side walls of said housing, a horizontal spit passing through said spindle and movable horizontally through the spindle and through opposite sides of the side walls of the housing for horizontal adjustment, said standard passing vertically through the housing, a motor and batteries housed in said housing battery, operated means carried by, and located in, said housing and driving said spindle by said motor, and means to lock said housing adjustably to said standard.

2. A portable demountable battery operated barbecue comprising a housing defined by enclosing walls, a vertical standard passing through the upper and lower walls of the housing, a hollow horizontal driving spindle journaled in opposite side walls of said housing, a horizontal spit passing through said spindle and movable through opposite sides of the housing for horizontal adjustment, said standard passing vertically through the housing, a battery arranged inside of the housing, battery operated means carried by said housing and driving said spindle from said motor, means to lock said housing adjustably to said standard, said standard being pointed at its lower end to permit said standard to penetrate the ground for support, and a base removably supporting said standard.

3. A portable demountable battery operated barbecue comprising a housing defined by enclosing walls, a vertical standard passing through the top and bottom walls of the housing, a horizontal hollow driving spindle journaled in said housing, a horizontal spit passing through said spindle and movable horizontally through opposite sides of the housing for horizontal adjustment, said standard passing vertically through the housing, a motor arranged within said housing, battery operated means carried by said housing and driving said spindle by said motor, means to lock said housing adjustably to said vertical standard, said standard being pointed at its lower end to permit said standard to penetrate the ground for support, and a base removably supporting said standard, said base comprising a plate having supporting feet, a member secured to the base and having a hole therein to receive the standard, said base having a hole therein in alinement with the last named hole but less in diameter, said standard being receivable in said alined holes.

4. A portable demountable battery operated barbecue comprising a housing defined by enclosing walls, a vertical standard passing through the housing, a horizontal hollow driving spindle journaled in said housing, a horizontal spit passing through said spindle and movable through opposite sides of the side walls of the housing for horizontal adjustment, said standard passing vertically through the upper and lower walls of the housing, a motor and batteries arranged within said housing, battery operated means carried by, and mounted in, said housing and driving said spindle and driven by said motor, means to lock said housing adjustably to said standard, said standard being pointed at its lower end to permit said standard to penetrate the ground for support, a base removably supporting said standard, said base comprising a plate having supporting feet, a member secured to the base and having a hole therein to receive the standard, said base having a hole therein in alinement with the last named hole but less in diameter, said standard being receivable in said alined holes, a second standard the same as the first standard and adapted to be spaced therefrom, and a spit support adjustably vertically on said second standard to receive and support said spit.

5. A portable demountable battery operated barbecue comprising a housing defined by enclosing walls, a vertical standard passing through the housing, a horizontal hollow driving spindle journaled in opposite side walls of said housing, a horizontal spit passing through said spindle and movable through opposite sides of the housing for horizontal adjustment, said standard passing vertically through the top and bottom walls of the housing, batteries and a motor totally housed within said housing, battery operated means carried by, and arranged in, said housing and driving said spindle by said motor, means to lock said housing adjustably to said standard, said standard being pointed at its lower end to permit said standard to penetrate the ground for support, a base removably supporting said standard, said base comprising a plate having supporting feet, a member secured to the base and having a hole therein to receive the standard, said base having a hole therein in alinement with the last named hole but less in diameter, said standard being receivable in said alined holes, a second standard the same as the first standard and adapted to be spaced therefrom, a spit support adjustable vertically on said second standard to receive and support said spit, and a second base, identical with the first base to support the second standard.

6. A portable demountable battery operated barbecue comprising a housing having enclosing walls, a motor arranged totally inside of said housing and secured to an inner surface of one of said walls, a horizontal hollow driving spindle inside of the housing and extending from the outer face of one wall to the outer face of an opposite wall, a spit extending horizontally through said spindle and movable axially through said housing, a chain of gears inside of the housing and mounted on an inner wall of said housing and driving the spindle from the motor, a dry cell battery support on a wall of the housing, dry cell batteries removably mounted on said support, electric contacts on said support for electric contact with the dry cell batteries, conductors electrically connected to said motor and said contacts, a switch within the housing and interposed between the batteries and said motor, said housing having openings in the upper and lower walls, a vertical support slidable in said latter openings and extending through the housing, and locking means to lock the housing adjustably to said support.

References Cited in the file of this patent
UNITED STATES PATENTS

| | | |
|---|---|---|
| 873,123 | Gardy | Dec. 10, 1907 |
| 1,473,045 | Puttaert et al. | Nov. 6, 1923 |
| 2,477,183 | Humensky | July 26, 1949 |
| 2,486,345 | Triulzi | Oct. 25, 1949 |
| 2,505,976 | Leon | May 2, 1950 |
| 2,520,450 | Austin | Aug. 29, 1950 |